US011227286B2

(12) United States Patent
Song et al.

(10) Patent No.: US 11,227,286 B2
(45) Date of Patent: *Jan. 18, 2022

(54) SECURE CHECK CLEARANCE SYSTEM

(71) Applicants: Yuh-shen Song, Porter Ranch, CA (US); Catherine Lew, Porter Ranch, CA (US); Alexander Song, Porter Ranch, CA (US); Victoria Song, Porter Ranch, CA (US)

(72) Inventors: Yuh-shen Song, Porter Ranch, CA (US); Catherine Lew, Porter Ranch, CA (US); Alexander Song, Porter Ranch, CA (US); Victoria Song, Porter Ranch, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/953,045

(22) Filed: Apr. 13, 2018

(65) Prior Publication Data

US 2018/0232738 A1 Aug. 16, 2018

Related U.S. Application Data

(63) Continuation of application No. 14/242,615, filed on Apr. 1, 2014, now Pat. No. 9,978,066.

(51) Int. Cl.
*G06Q 20/00* (2012.01)
*G06Q 20/40* (2012.01)
*G06Q 20/04* (2012.01)

(52) U.S. Cl.
CPC ....... *G06Q 20/4016* (2013.01); *G06Q 20/042* (2013.01)

(58) Field of Classification Search
CPC .................................................. G06Q 40/00

(Continued)

(56) References Cited

U.S. PATENT DOCUMENTS

| 7,377,425 | B1 * | 5/2008 | Ma | G06Q 20/042 235/379 |
| 2003/0172030 | A1 * | 9/2003 | Volgunin | G06Q 20/042 705/42 |

(Continued)

OTHER PUBLICATIONS

Published in: The 9th IEEE International Conference on E-Commerce Technology and the 4th IEEE International Conference on Enterprise Computing, E-Commerce and E-Services (CEC-EEE 2007) (pp. 99-106) Authors: N.R. Sunitha • B.B. Amberker • P. Koulgi • P. Siddharth [+details] (Year: 2007).*

*Primary Examiner* — Bruce I Ebersman
*Assistant Examiner* — John A Anderson
(74) *Attorney, Agent, or Firm* — Seyfarth Shaw LLP

(57) ABSTRACT

A method for verifying a name on a check include receiving, from a check issuer computer system, a first payee name and first check information and associating the first payee name with the first check information. The method also includes receiving second check information electronically read by a first device at the payee financial institution. The method further includes receiving a second payee name electronically read from an identification document and comparing the first check information with the second check information. The method still further includes verifying that the first payee name corresponds to the second payee name when the first payee name matches the second payee name; and sending, in response to the verification, a name verification message indicating the first payee name corresponds to the second payee name.

15 Claims, 5 Drawing Sheets

(58) Field of Classification Search
USPC .......................................................... 705/35
See application file for complete search history.

(56) References Cited

U.S. PATENT DOCUMENTS

| | | | |
|---|---|---|---|
| 2003/0213841 A1 | 11/2003 | Josephson et al. | |
| 2005/0125337 A1* | 6/2005 | Tidwell | G06Q 40/02 705/39 |
| 2008/0010204 A1* | 1/2008 | Rackley, III | G06Q 20/042 705/45 |
| 2009/0313069 A1* | 12/2009 | Love | G06K 5/00 235/380 |
| 2011/0270755 A1* | 11/2011 | Pinski | G06Q 20/40 705/44 |

\* cited by examiner

SECURE CHECK CLEARANCE SYSTEM

CROSS-REFERENCE TO RELATED APPLICATION

The present application is a continuation of U.S. patent application Ser. No. 14/242,615, filed on Apr. 1, 2014, and titled "PRIVACY-PROTECTED CHECK CERTIFICATION SYSTEM," the disclosure of which is expressly incorporated by reference herein in its entirety.

TECHNICAL FIELD

The present disclosure relates generally to a check certification system. More specifically, one aspect of the present disclosure relates to certifying the legitimacy of checks to prevent all types of fraud associated with checks without disclosing private information on the checks.

BACKGROUND

A check is a very old financial instrument. With the help of modern technologies, fraudsters can easily commit check fraud today. Financial institutions, merchants, and consumers are losing hundreds of millions of dollars every year because of check fraud. According to banking regulations, a bank has to honor a paper check (generally referred to as "check" hereinafter) when the signature on the check matches a signature of an authorized signer of the checking account of the bank. However, because the signature of the authorized signer may be slightly different each time he signs a check, a bank has to tolerate a certain degree of signature variation. As a result, a fraudster can easily imitate and duplicate the signature of an authorized signer without being detected. In fact, with today's scanning and printing technology, a fraudster can fabricate a counterfeit check with a "no-flaw" signature.

Many methods have been used to prevent check fraud. For example, a bank can use a check fraud detection system to examine whether the check number of a deposited check has already been used before. If the check number has already been used before, something may be wrong. In the banking industry, such examination is often referred to as "detection of a duplicate check number." Similarly, a check fraud detection system can also examine whether the check number of a deposited check is within a reasonable range of the check numbers that have already been cleared for the checking account. If the check number of a deposited check is far away from the check numbers of checks that have already been cleared, something may be wrong. In the banking industry, such examination is often referred to as "detection of an out-of-range check number." Additionally, if there is an unusually large dollar amount on a deposited check, an unusually large aggregate dollar amount based on multiple deposited checks or an unusually large number of checks being deposited, something may be wrong. When something may be wrong, the fraud detection system will alert the bank to investigate the detected case.

These traditional approaches to prevent check fraud are only partially effective because an experienced fraudster knows the weakness of these types of fraud detection. For example, a fraudster can copy a payroll check of an employee of a company and fabricate a "no flaw" counterfeit check with a similar dollar amount. In addition, the fraudster can fabricate a check number that is larger than the check number of the real payroll check by a range that is about the number of the employees of the company. As a result, the fraudster can easily fabricate a "no flaw" counterfeit check with a very reasonable check number that is not "out-of-range" and is not a "duplicate check number." Because the dollar amount on the counterfeit check is similar to that of a real payroll check and the counterfeit check is deposited during a normal payroll period, the fraud detection system cannot detect anything wrong. The fraudster can simply cash this "no flaw" counterfeit check in a bank without being detected. When the real checking account holder identifies this "no flaw" counterfeit check later, the fraudster has already received money and disappeared.

As an alternative check fraud prevention method, a bank can use a "positive-pay" system, which requires a check issuer to report to the bank all the checks that have been issued. A positive-pay database is established to collect the reported checks issued by check issuers. As a result, if a check that is returned to a checking account for clearing does not match the positive-pay record of the checking account, the check will be rejected by the bank. However, this positive-pay system has some limitations. For example, Bank A has no way to tell whether a check issued from a checking account of Bank B is valid or not, because the positive-pay record regarding the checking account is only available in Bank B. As a result, a fraudster can still cash a counterfeit check in Bank A without being detected.

In addition, a fraudster can transfer a stolen check from the payee to the fraudster by signing the payee name on the back of the check to endorse the transfer. When the fraudster cashes the transferred check at Bank B, even with a positive pay record in Bank B, a teller at Bank B (i.e., the payer bank) cannot reject the check because there is no record of the signature of the payee available in Bank B and the teller has no basis to assume the transfer from the payee to the fraudster is improper.

In fact, a fraudster can easily cheat Bank A by depositing any counterfeit check issued from a checking account of Bank B. If Bank A honors the check right away because it is not a large amount, by the time the deposited check is rejected by Bank B and returned to Bank A, the fraudster has already withdrawn the money. Because the dollar amount is not large enough, Bank A cannot justify a lawsuit against the fraudster, especially when the fraudster claims that he simply deposited a check issued by another party. For most cases, a bank will not take any legal action against the fraudster because of the high cost involved in such litigation, but will simply close the account of the fraudster and deny any future relationship with the fraudster. However, closing an account does not have much impact on the fraudster because he can just open a new account with another bank and play the same trick again. This type of fraud is often referred to as "deposit fraud" and is prevailing throughout the USA today. Because there are at least 10,000 banks and credit unions in the USA, a fraudster, who commits deposit fraud, can easily change one financial institution per week and cheat financial institutions one by one for the rest of his life.

Furthermore, many financial institutions permit customers to remotely deposit checks by taking photos of the checks and sending the check images to the financial institutions. A fraudster can deposit the same check image into five different accounts at five different financial institutions. As a result, a fraudster may be able to cash the same check five times.

Moreover, a fraudster can alter a payee name on a check. Because an altered check cannot be easily identified as having been altered based on a check image, a fraudster can easily deposit an altered check remotely into his account without being detected. Because a positive pay record does not have the payee name (which will be explained in the detailed description later), a payer bank with a positive pay system cannot detect such fraud.

In addition, a payer can also commit fraud by leaving insufficient funds in his checking account. Under such circumstances, a legitimate payee may not be able to collect money based on a legitimate check.

In summary, none of the traditional check fraud prevention methods are truly effective to prevent all types of fraud associated with checks today.

SUMMARY OF THE DISCLOSURE

One aspect of the present disclosure certifies the legitimacy of check transactions. Furthermore, one aspect of the present disclosure helps financial institutions prevent all types of fraud associated with check transactions.

In one aspect of the present disclosure, a computer system (including a computer program and a computerized method), which certifies legitimacy of a check transaction with privacy protection, receives a routing number, an account number, a check number, a dollar amount and a payee name of a check from a holder of a checking account of a first financial institution. The check is issued by the holder of the checking account. The computer system (including a computer program and a computerized method) sends the payee name of the check to a second financial institution when the routing number, the account number, the check number and the dollar amount of the check are received from the second financial institution.

Furthermore, the computer system (including a computer program and a computerized method) receives an indicator from the first financial institution after the check has been cleared by the first financial institution. Moreover, the computer system (including a computer program and a computerized method) informs the second financial institution that the check has already been cleared. Additionally, the computer system (including a computer program and a computerized method) informs a third financial institution that an entity has already made an inquiry when the routing number, the account number, the check number and the dollar amount of the check are received from the third financial institution.

In one aspect of the present disclosure, a computer system (including a computer program and a computerized method), which certifies legitimacy of a check transaction with privacy protection, receives a routing number, an account number, a check number, a dollar amount and a payee name of a check from a holder of a checking account of a first financial institution. The check is issued by the holder of the checking account. The computer system (including a computer program and a computerized method) sends the dollar amount of the check to a second financial institution when the routing number, the account number, the check number and the payee name of the check are received from the second financial institution.

In another aspect of the present disclosure, a computer system (including a computer program and a computerized method), which certifies legitimacy of a check transaction with privacy protection, receives a routing number, an account number, a check number, a dollar amount and a payee name of a check from a holder of a checking account of a first financial institution. The check is issued by the holder of the checking account. The computer system (including a computer program and a computerized method) sends the check number of the check to a second financial institution when the routing number, the account number, the dollar amount and the payee name of the check are received from the second financial institution.

In one aspect of the present disclosure, a computer system (including a computer program and a computerized method), which certifies legitimacy of a check transaction with privacy protection, receives a routing number, an account number, a check number, a dollar amount and a payee name of a check from a holder of a first account of a first financial institution. The check is issued by the holder of the first account. The computer system (including a computer program and a computerized method) receives from a second financial institution the routing number, the account number, the check number, the dollar amount and a name of a holder of a second account of the second financial institution. The second account is independent from the holder of the first account. The computer system (including a computer program and a computerized method) confirms legitimacy of a deposit of the check into the second account when the name of the holder of the second account corresponds to the payee name of the check.

Furthermore, the computer system (including a computer program and a computerized method) alerts the first financial institution when the payee name does not correspond to at least one of the names of the holders of the second account. Moreover, the computer system (including a computer program and a computerized method) alerts the second financial institution when the payee name does not correspond to at least one of the names of the holders of the second account.

In one aspect of the present disclosure, a computer system (including a computer program and a computerized method), which certifies legitimacy of a check transaction with privacy protection, receives a routing number, an account number, a check number, a dollar amount and a payee name of a check from a holder of a first account of a first financial institution. The check is issued by the holder of the first account. The computer system (including a computer program and a computerized method) instructs a transfer of a first fund associated with the dollar amount of the check from the first account to a second account of a second financial institution. The second account is independent from the holder of the first account. The computer system (including a computer program and a computerized method) instructs a transfer of a second fund associated with the dollar amount of the check from the second account to a third account of a third financial institution when the routing number, the account number, the check number, the dollar amount and the payee name of the check are received from the third financial institution.

In this disclosure, the terminology "check" or "checks" generally refers to the traditional paper check or paper checks, which are cleared through the traditional check clearing systems, such as the Federal Reserve Check Clearing System. Unless it is specifically spelled out, check or checks do not include "electronic check or checks," "virtual check or checks," etc., which are terminologies created by Internet companies, such as PayPal, etc.

In this disclosure, the terminology "network" or "networks" generally refers to a communication network or networks, which can be wireless or wired, private or public, real time or non-real time, or a combination of them, and includes the well-known Internet.

In this disclosure, the terminology "computer" or "computer system" generally refers to either one computer or a group of computers, which may work alone or work together to reach the purposes of the system.

In this disclosure, the terminology "processor" generally refers to either one processor or a group of processors, which may work alone or work together to accomplish the purposes of the computer system.

In this document the term "module" refers to a single component or multiple components which can be hardware, software, firmware, or a combination thereof, and may work alone or work together to accomplish the purposes of the module.

In this document the term "device" refers to a single component or multiple components which can be hardware, software, firmware, or a combination thereof, and may work alone or work together to accomplish the purposes of the device.

In this disclosure, "retail businesses" generally refer restaurants, fast food stores, food stands, food trucks, bookstores, clothing stores, grocery stores, drug stores, gift stores, shoe stores, bag stores, clothing stores, furniture stores, convenience stores, electronic stores, appliance stores, equipment stores, tool stores, department stores, gardening stores, building material stores, supermarkets, bus stops, bus stations, train stops, train stations, taxi stands, car shops, boat shops, vehicle shops, hotels, apartments, financial institutions, money services providers, schools, theaters, parks, fair grounds, entertainment centers, hospitals, medical centers, dentist offices, doctor offices, beauty salons, barbershops, goods providers, service providers, organizations, clubs, associations, companies, offices, businesses, kiosks, machines, or any types of facilities which interface with customers.

In this disclosure, a "bank" or "financial institution" generally refers to a financial service provider, either a bank or a non-bank, where financial services are provided.

In this disclosure, a "bank account" or "financial account" generally refers to an account associated with a financial institution, either a bank or a non-bank, where financial transactions can be conducted through financial instruments such as cash, checks, credit cards, debit cards, ATM cards, stored value cards, gift cards, pre-paid cards, wires, monetary instruments, letters of credit, notes, securities, commercial papers, commodities, precious metal, electronic fund transfers, automatic clearing house, etc.

In this disclosure, "financial transactions" generally refer to transactions related to financial activities, including but not limited to payment, fund transfer, money services, payroll, invoicing, trading, escrow, insurance, underwriting, merger, acquisition, account opening, account closing, etc.

In this disclosure, "trading" generally refers to trading activities, both private and public, including but not limited to trading of stock, currency, commodities, rights, values, securities, derivatives, goods, services, merchandise, etc.

In this disclosure, "securities" are generally referred to according to the definition in the Securities Act of 1933. For example, securities may generally include note, stock certificate, bond, debenture, check, draft, warrant, traveler's check, letter of credit, warehouse receipt, negotiable bill of lading, evidence of indebtedness, certificate of interest or participation in any profit-sharing agreement, collateral-trust certificate, preorganization certificate or subscription, transferable share, investment contract, voting-trust certificate; valid or blank motor vehicle title; certificate of interest in property, tangible or intangible; instrument or document or writing evidencing ownership of goods, wares, and merchandise, or transferring or assigning any right, title, or interest in or to goods, wares, and merchandise; or, in general, any instrument commonly known as a "security", or any certificate of interest or participation in, temporary or interim certificate for, receipt for, warrant, or right to subscribe to or purchase any of the foregoing.

In this disclosure, a "consumer" generally refers to a customer, person, subject, subject person, payer, user, or client, etc., seeking to perform a transaction with an individual, an organization, a merchant, and/or a financial institution.

In this document, the terminology "official identification document" generally refers to a passport, driver's license, voter card, benefits card, student identification card, social security card, national identification card, identity card, certificate of legal status, and other official documents and information bearing instruments that identify a designated individual by certain verifiable characteristics, that are issued or certified by a consulate, embassy, government agency, or other governmental authorities, and that are protected against unauthorized copying or alteration by the responsible government. In particular, such "official identification documents" can be formed from various materials, including paper, plastic, polycarbonate, PVC, ABS, PET, Teslin, composites, etc., and can embed the identification information in various formats, including printed or embossed on the document (or card), written on a magnetic medium, programmed into an electronic device, stored in a memory, and combinations thereof. The "identification information" may include, but is not necessarily limited to, names, identification numbers, date of birth, signatures, addresses, passwords, phone numbers, email addresses, personal identification numbers, tax identification numbers, national identification numbers, countries that issue the IDs, states that issue the IDs, ID expiration date, photographs, fingerprints, iris scans, physical descriptions, and other biometric information. The embedded information can be read through optical, acoustic, electronic, magnetic, electromagnetic and other media.

In this disclosure, "personal identification information" generally refers to name, address, date of birth, personal identification number, user ID, password, tax identification number, type of the identification document used, identity number associated with the identification document, country, state, government organization and/or a private organization issuing the identification document, expiration date of the identification document, phone number, screen name, e-mail address, photographs, fingerprints, iris scans, physical descriptions, and other biometrical information.

In this disclosure, "personal information" includes at least personal identification information, personal relationships, personal status, personal background, personal interests, and personal financial information including information related to financial instruments, financial accounts and financial activities.

In this disclosure, "financial instruments" generally refer to instruments which are used to conduct financial transactions. Examples of financial instruments include cash, credit cards, debit cards, ATM cards, prepaid cards, stored value cards, gift cards, checks, monetary instruments, wire transfers, letters of credit, notes, securities, commercial papers, commodities, gold, silver, etc.

In this disclosure, a "personal communication device" generally refers to a device interface used for personal communication purposes.

In this disclosure, a "personal communication address" generally refers to an identifier which is used to identify a person or an entity during private communications. For example, a mobile phone number is a personal communication address. An email address is a personal communication address.

In this disclosure, "device interface" generally refers to keyboard, keypad, monitor, display, terminal, computer, mobile phone, smartphone, Smartbook, iPad, Mac Book, Chromebook, Windows tablet, Personal Digital Assistant (PDA), smart watch, smart wearable devices, control panel, vehicle dash board, network interface, machinery interface, video interface, audio interface, electrical interface, electronic interface, magnetic interface, electromagnetic interface including electromagnetic wave interface, optical interface, light interface, acoustic interface, video interface, audio interface, contactless interface, handheld device interface, portable device interface, wireless interface, wired interface, or other type of interface.

In this document, the terminology "terminal" or "kiosk" generally refers to equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, Smartbook, personal communication device, PDA, digital assistant, entertainment device, network interface device, router, and/or Personal Digital Assistant (PDA), etc., which interfaces a user with a computer network, so that the user may interact with computer systems and other equipment connected to the computer network.

For a further understanding of the nature and advantages of the disclosure, reference should be made to the following description taken in conjunction with the accompanying drawings.

DETAILED DESCRIPTION

Figure 1:
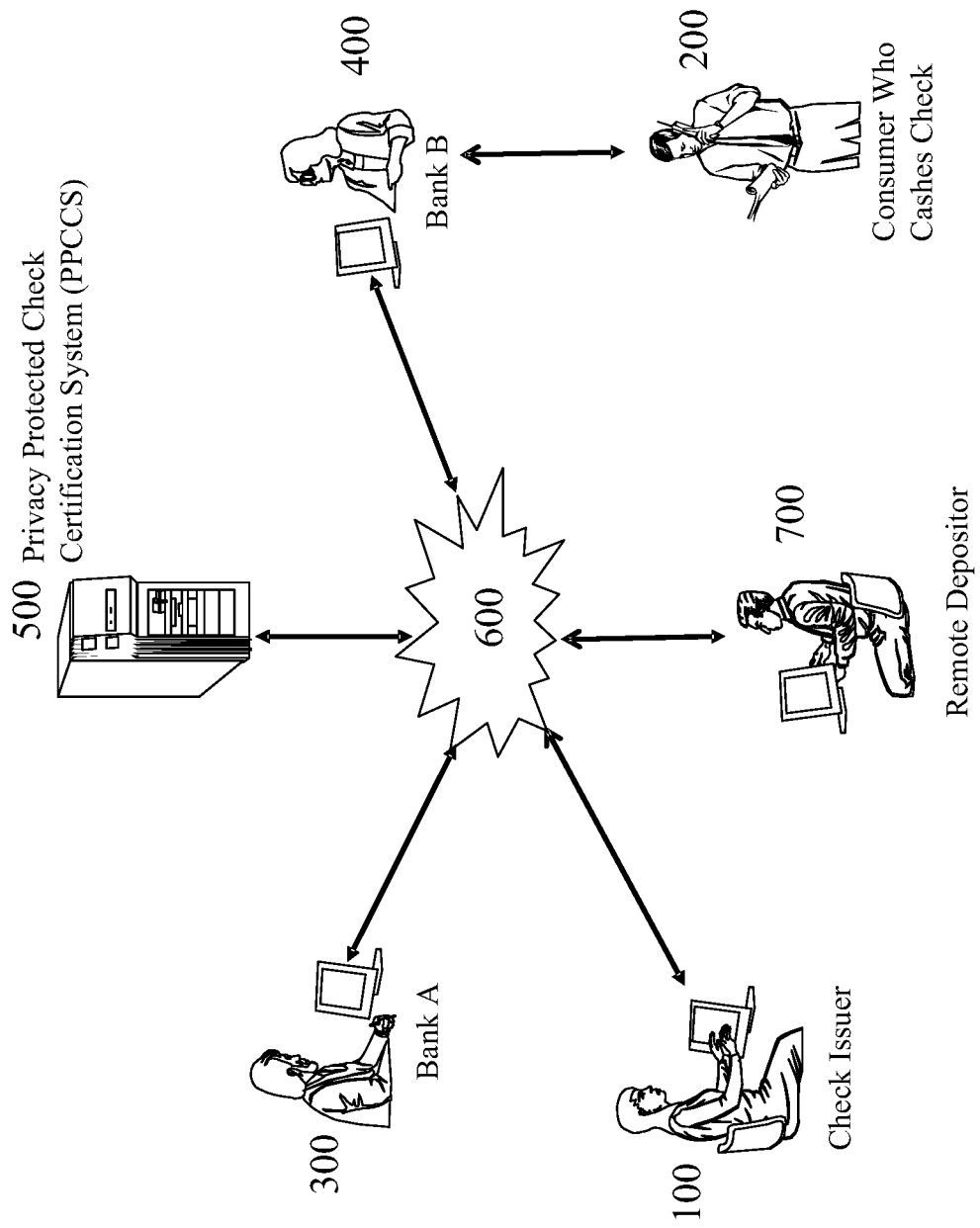
FIG. 1 illustrates a system and network diagram of a Privacy Protected Check Certification System ("PPCCS") to certify the legitimacy of check transactions.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form to avoid obscuring such concepts. As described herein, the use of the term "and/or" is intended to represent an "inclusive OR", and the use of the term "or" is intended to represent an "exclusive OR".

Checks had been used as the primary payment instruments for over a century. When checks were invented, a payee needed to cash a check at the same bank (i.e., Payer Bank) that had sufficient funds from a payer to pay for the check issued by the payer. For clarification purposes, we will refer to the checks issued by a payer of a Payer Bank as "checks belonging to the Payer Bank" or "checks of the Payer Bank" although the Payer Bank may not directly issue the checks to payees. Sometimes, a Payer Bank is also referred to as a Payor Bank. When a payee deposits a check into a bank or cashes a check at a bank that is different from the Payer Bank, the bank is referred to as the Payee Bank.

At the beginning, a Payer Bank only needed to process its own checks, which were collected from its own branches. However, in order to compete with larger banks that had more branches, two banks might have a mutual arrangement to accept the checks of each other. Under that type of arrangement, Bank A accepted checks issued from customers of either Bank A or Bank B then sent Bank B the checks belonging to Bank B. Similarly, Bank B accepted checks issued from customers of either Bank B or Bank A, and then sent Bank A the checks belonging to Bank A.

As time goes on, more banks have reached such mutual arrangements. At the end of a business day, each bank would send out checks belonging to other banks and receive its own checks collected by other banks. Because the number of banks had increased tremendously and such mutual arrangements became burdens to banks, the Federal Reserve took over the primary role as a central point for check clearing, which collected from each bank checks belonging to other banks and sent to each bank its own checks collected by other banks.

As a result of this historical background, the Federal Reserve Check Clearing System is extremely busy because it collects checks from almost all banks and sends checks to almost all banks. As a member of the Federal Reserve Check Clearing System, a bank needs to (1) collect checks from its branches, (2) process its own checks (also known as the "on us checks") collected from its branches, (3) send other banks' checks (also known as the "transit items") collected from its branches to the Federal Reserve, (5) process its own checks (also known as the "inclearing checks") received from Federal Reserve that have been collected by other banks, (6) return to the Federal Reserve all the inclearing checks rejected by the bank, and (7) handle returned transit items received from the Federal Reserve that have been rejected by other banks.

In the above check clearing process, the delivery and processing of paper checks is a huge burden to the Federal Reserve. Such delivery and processing of paper checks also causes a major delay in the check payment system. For example, it takes several days to deliver a paper check from a Payee Bank on the west coast of the USA to a Payer Bank on the east coast of the USA for clearing purposes. If the check is rejected by the Payer Bank, it takes several days to deliver the rejected paper check back to the Payee Bank. Such a long delay further gives fraudsters more chances to commit check fraud. For example, because the banking regulation demands a Payee Bank to release funds to a payee within a predefined period of time after the check is deposited, a fraudster who deposits a counterfeit check of a Payer Bank on the east coast into a Payee Bank on the west coast will have sufficient time to withdraw money from the Payee Bank before the rejected check is returned to the Payee Bank.

To remove the overhead and the delay caused by paper checks, a new law (also known as "Check 21," i.e., check for the $21^{st}$ century) permits banks to send and receive check images, instead of paper checks, for check clearing purposes. As a result of this new law, the Federal Reserve has been able to reduce from over forty (40) paper-check processing centers in 2003 down to one (1) paper-check processing center in 2014.

Many banks do not even collect paper checks from payees who conduct remote deposits. Instead, a remote depositor can simply use a smart phone to take a picture of a check and send the image of the check to his bank to complete a check deposit transaction through a software application on his smart phone (i.e., mobile app). In general, a bank does not receive from the Federal Reserve inclearing paper checks collected by other banks any more. Instead, a bank receives from Federal Reserve an electronic file which lists all inclearing checks plus images of the inclearing items. A bank also does not send to the Federal Reserve transit paper checks belonging to other banks that are collected from the branches. Instead, a bank sends to the Federal Reserve an electronic file listing all transit items plus images of the transit items.

Although the Check 21 law reduces the overhead and speeds up the check clearing process, it also provides additional loopholes for fraudsters to commit check fraud. For example, a hologram symbol on a paper check could effectively prevent check fraud before the Check 21 practice. However, a hologram symbol is no longer useful when a check image is used for check clearing purposes.

The payment role of checks has been reducing every year because of the increasing popularity of new payment instruments, such as credit card, debit card, prepaid card, ACH, etc., used by consumers. Nevertheless, government organizations and businesses still use checks as their primary payment instruments. About one hundred million checks are still going through the Federal Reserve Check Clearing System every day. A high percentage of these checks are issued by government organizations and businesses. About 0.5% of these checks are rejected because of all types of fraud associated with these checks.

On a check, there is routing number, which identifies the bank ("Payer Bank") that has the checking account. There is an account number, which identifies the checking account that belongs to a check issuer ("payer"). There is a serial number, which is often referred to as the check number. As a result, each check is identified by three (3) numbers, i.e., a routing number, an account number and a check number. These three (3) numbers are printed at the bottom of the check in MICR format, which can be easily read by a MICR reader. In addition, a dollar amount and a payee name define the transactional details of the payment transaction between the payer and the payee.

Because checks are often written by hand, the payee names are not recognizable by computers. Consequently, payee names are not recorded by the Federal Reserve Check Clearing System during the check clearing processes. When a bank receives from the Federal Reserve an electronic file, which lists all the inclearing checks collected by other banks, such file does not contain any payee name. The payee name of a check may be shown on a check image. However, with the large number of checks a bank needs to process every day, no bank can afford to obtain a payee name from each check image. Similarly, when a bank sends the Federal Reserve an electronic file, which lists all the transit items belonging to other banks, such file also does not contain any payee name. A bank simply sends the check images together with the electronic file. In short, payee names are not readable by a computer based on the electronic files provided by the Federal Reserve Check Clearing System or other similar check clearing systems.

Therefore, a traditional check fraud prevention system cannot use payee names to detect fraud because the payee name information is not easily available. For example, when a positive pay system is used to detect check fraud, the payee names are not even stored in the positive pay database because a list of inclearing checks received from Federal Reserve does not contain payee names. Under such circumstances, if a payee name of a valid check is altered and the altered check is deposited into a fraudster's account, a bank with a positive pay system cannot detect such fraud. This is why fraudsters can steal checks, alter the payee names and deposit the altered checks without being detected. In fact, a fraudster can also steal checks, signing the names of the payees on the back of the checks to transfer the checks to the fraudster, then cash or deposit the checks without being detected by a positive pay system because a positive pay system cannot tell that such transfer of checks is illegitimate.

In one aspect of the present disclosure, a check issuer opens an account with a computer system (referred to as the "Privacy Protected Check Certification System" or "PPCCS") and provides the PPCCS computer system with the routing number and the account number of his checking account. In addition, the check issuer uploads the check numbers, dollar amounts, payee names, payee phone numbers, and/or email addresses of all the checks issued by the check issuer. In general, the check numbers, dollar amounts and payee names are available to the payer, while the payee phone numbers and email addresses may not be available. In another aspect of the present disclosure, to simplify the process, the check issuer only uploads the check numbers, dollar amounts, and payee names of all the checks issued by the check issuer.

The PPCCS computer system is available to all check issuers through the Internet, mobile phone networks or other types of networks. As a result, routing numbers, account numbers, check numbers, dollar amounts, and payee names as well as payee phone numbers and/or email addresses of all checks issued by all check issuers worldwide can be stored in a database of the PPCCS computer system. Because all check issuance records are stored in the database, all check transactions can be certified by the PPCCS computer system.

In general, a routing number of a bank is in the public domain and a fraudster can easily find such information. It is also not difficult for a fraudster to find an account number of the check issuer. Consequently, a fraudster can easily find the correct routing number and account number of a check issuer. However, the fraudster needs to guess a check number. If the fraudster chooses a check number that has not been issued yet, the PPCCS computer system will detect such check as a counterfeit check because there is no record about this check number in the database of the PPCCS computer system. Even if the fraudster luckily picks a check number that has already been issued, it is almost impossible to correctly guess the dollar amount and the payee name.

In general, a check can be converted into a monetary value through a check cashing transaction, a check deposit transaction or a check transfer transaction. A check certification process should be performed for each of the above three (3) types of transactions to completely prevent all types of check fraud caused by payees or third parties.

In one aspect of the present disclosure, when a consumer cashes a check in a bank, the routing number, account number, check number and dollar amount of the check are directly read by a device and are uploaded to the PPCCS computer system. In another aspect of the present disclosure, the routing number, account number, check number and dollar amount of the check are manually entered by the bank into the PPCCS computer system. In yet another aspect of the present disclosure, some of the routing number, account number, check number and payee name of the check are directly read by a device and uploaded to the PPCCS computer system, while the rest of the information is manually entered by the bank into the PPCCS computer system.

When a consumer cashes a check in a bank, it is conventional to verify an identity of the consumer through his official identification document. Therefore, the name of a consumer who cashes a check is available to the financial institution that provides the check cashing service. In one aspect of the present disclosure, when a consumer cashes a check in a bank (which is either a Payer Bank or any other financial institution), an official identification document such as driver's license, passport, etc., of the consumer can be read by a device so that the name of the consumer can be directly obtained from the official identification document and uploaded to the PPCCS computer system. In an alternative aspect of the present disclosure, the bank is prompted by the PPCCS computer system to manually enter the name of the consumer who cashes the check.

The PPCCS computer system uses the routing number and account number to identify the checking account of the check issuer. If the PPCCS computer system cannot find the correct combination of routing number and account number, the check issuer may have not opened an account with the PPCCS computer system yet. The financial institution that intends to cash the check may use other means to verify the legitimacy of the check. If the PPCCS computer system can find the routing number and account number, but cannot find the check number, this check may be a counterfeit check because there is no such record about this check although the check issuer has already opened an account with the PPCCS computer system. The PPCCS computer system informs the financial institution, which intends to cash the check, of the possible fraud detected by the PPCCS computer system.

If the PPCCS computer system can find the routing number, account number and check number, the PPCCS computer system should verify whether the dollar amount provided by the financial institution, which intends to cash the check, matches the dollar amount record provided by the check issuer. If the dollar amount on the check does not match the record provided by the check issuer, the PPCCS computer system informs the financial institution, which intends to cash the check, of the possible fraud detected by the PPCCS computer system.

If the dollar amount is also correct, the PPCCS computer system will further verify whether the name of the consumer, who intends to cash the check, corresponds to the payee name record provided by the check issuer. If the name of the consumer does not correspond to the payee name record provided by the check issuer, the PPCCS computer system informs the financial institution, which intends to cash the check, of the possible fraud detected by the PPCCS computer system.

If the name of the consumer who intends to cash the check corresponds to the payee name record that is provided by the check issuer, this check transaction is considered to be a legitimate transaction. In one aspect of the present disclosure, the PPCCS computer system informs the Payer Bank of the legitimacy of the transaction. In another aspect of the present disclosure, the PPCCS computer system informs the financial institution, which intends to cash the check, of the legitimacy of the transaction.

The phrase "corresponds to" is used because the same name may have different variations. For example, "Michael" corresponds to "Mike" although they are two different words; "Robert" corresponds to "Bob" although they are two different words, etc. Sometimes, it is a burden for a person to manually enter a full name of a consumer. It also creates unnecessary human mistakes when a long full name is manually entered by a person. In one aspect of the present disclosure, the PPCCS computer system compares a partial name of the consumer with a partial name of the payee in the record. For example, the PPCCS computer system may use the initial of the last name and the initial of the first name, instead of the full name, for comparison purposes. As another example, the PPCCS computer system may use the first three (3) letters of the last name for comparison purposes. The chance for a fraudster to correctly guess a check number, a dollar amount and a partial name is extremely low.

Once a certification process has been successfully completed for a particular check, the PPCCS computer system records such certification result and time stamp in the database of the PPCCS computer system. In one aspect of the present disclosure, if the same particular check is presented for another certification again, something may be wrong because the same check cannot be cashed or deposited twice. The PPCCS computer system informs the financial institution, which presents the particular check for the second certification, of possible fraud associated with the particular check.

Once a check has been cleared by a Payer Bank, the Payer Bank informs the PPCCS computer system and the PPCCS computer system records such check clearing result and time stamp in the database of the PPCCS computer system. Under such circumstances, in one aspect of the present disclosure, if the same check is presented for certification later, something is wrong because the check has already been cleared and cannot be cashed or deposited again. The PPCCS computer system informs the financial institution, which presents the particular check for the second certification, of possible fraud associated with the check.

In one aspect of the present disclosure, when a consumer deposits a check into his account in a financial institution (which is either a Payer Bank or any other financial institution), the financial institution sends to the PPCCS computer system the names of the account holders of the account that receives the deposited check.

In another aspect of the present disclosure, the account number of the account that receives the deposited check can be obtained by scanning the MICR line of the deposit slip provided by the depositor. In another aspect of the present disclosure, a person can manually enter (or search) the account number that receives the deposited check. In yet another aspect of the present disclosure, when the check is deposited remotely, the account that receives the deposited check image is identified by the login credential of the depositor. Once the account (or account number) is identified by the financial institution, the financial institution can easily obtain and send the names of the account holders to the PPCCS computer system. If this check deposit transaction is a legitimate transaction, one of the names of the account holders should correspond to the payee name record provided by the check issuer.

In addition, the financial institution, which accepts the deposited check, sends the routing number, account number, check number and dollar amount of the deposited check to the PPCCS computer system. In one aspect of the present disclosure, the routing number, account number, check number and dollar amount of the deposited check are directly uploaded to the PPCCS computer system. In another aspect of the present disclosure, the routing number, account number, check number and dollar amount of the deposited check are manually entered into the PPCCS computer system. In yet another aspect of the present disclosure, some of the routing number, account number, check number and payee name of the deposited check are directly read by the PPCCS computer system, while the rest of the information is manually entered into the PPCCS computer system.

Similar to a check cashing transaction as described above, the routing number and account number of the deposited check identify the checking account of the check issuer in the database of the PPCCS computer system. Once the checking account is identified, the check number, dollar amount and payee name can be used to detect possible fraud. If the check number cannot be found, there is a possible fraud case. If the dollar amount of the deposited check does not match the dollar amount provided by the check issuer, there is a possible fraud case. If none of the account holder names of the account that receives the deposited check corresponds to the payee name record provided by the check issuer, there is a possible fraud case. In one aspect of the present disclosure, the PPCCS computer system informs the financial institution, which accepts the deposited check, of the possible fraud associated with the deposited check. In another aspect of the present disclosure, the PPCCS computer system informs the Payer Bank of the possible fraud associated with the deposited check.

On the other hand, if any one of the account holder names corresponds to the payee name record provided by the check issuer, and the routing number, account number, check number and dollar amount also match the record provided by the check issuer, this check transaction is considered to be a legitimate transaction. In one aspect of the present disclosure, the PPCCS computer system informs the Payer Bank of the legitimacy of the transaction. In another aspect of the present disclosure, the PPCCS computer system informs the financial institution, which accepts the deposited check, of the legitimacy of the transaction.

In one aspect of the present disclosure, when a consumer cashes or deposits a check that has been transferred to the title of the consumer, the financial institution, which conducts the cashing or deposit transaction with the consumer, provides the routing number, account number, check number, dollar amount, and payee name shown on the check to the PPCCS computer system. As explained above, each of the routing number, account number, check number, dollar amount and payee name can be either directly read by a device or manually entered by a person. In practice, because entering a full name is a time-consuming process, it may not be necessary to enter the full payee name shown on the check. Alternatively, only a partial name, such as first three (3) letters of the first name needs to be manually entered.

In one aspect of the present disclosure, if the routing number, account number, check number, dollar amount and payee name (or partial payee name) shown on the check all match the record provided by the check issuer, a person working for the bank can contact the payee based on the phone number (or email address) record provided by the check issuer so that the bank can verify whether the payee has transferred the check to the consumer who intends to cash or deposit the check. If there are multiple transfers, the bank can start with contacting the payee and ask the payee to provide a phone number and/or email address of the person (i.e., the first transferee) to whom he transfers the check. By contacting the first transferee, the bank can find a phone number and/or email address of the second transferee. Through this chain of phone calls (or emails), the bank can eventually identify the last transferee who should be the consumer trying to cash or deposit the transferred check.

Because the present disclosure verifies the legitimacy of a check during check deposit, check cashing and check transfer, the present disclosure certifies the legitimacy of all types of check transactions. In the present disclosure, although a bank is often used as an example for a financial institution that offers checking accounts, the present disclosure can be applied to a bank, credit union, trust company, insurance company, stockbroker, stock dealer, investment company or any organization that offers a checking account to a customer. Similarly, in the present disclosure, although a bank is an example of a financial institution that accepts a check for either cashing or deposit, the present disclosure can also be applied to a bank, credit union, trust company, insurance company, stockbroker, stock dealer, investment company, money services business, casino, or any organization that pays money to a person in response to receiving a check from the person.

Many aspects of the present disclosure prevent check fraud committed by a third party or by a payee. In addition, the present disclosure also prevents fraud committed by payer. In one aspect of the present disclosure, after a payer provides the routing number, account number, check number, dollar amount, payee name, payee phone number and/or payee email address to the PPCCS computer system, the PPCCS transfers a fund associated with the dollar amount from the payer's account to an account owned by the PPCCS based on the routing number, account number, check number, and dollar amount of the issued check. The account owned by the PPCCS is independent from the account of the payer.

The phrase "associated with" is used because the PPCCS may charge payer a fee for providing such service. Under such circumstances, the PPCCS computer system transfers from payer a fund that is equivalent to the dollar amount of the check plus the fee. The fund transfer can be accomplished through some real-time and/or non-real-time networks, such as ACH networks, credit card networks, debit card networks, ATM networks, broker-dealer networks, etc. This fund transfer transaction can be legitimately conducted based on a commercial arrangement between the payer and the PPCCS. After the fund transfer has been completed, the PPCCS computer system informs the payee through the payee's phone number and/or email address that the fund has been secured by the PPCCS computer system. Under such circumstances, the payer cannot commit any fraud against the payee. In other words, the payer's check has been certified by the PPCCS as having a sufficient fund available to pay the check after the fund has been secured by the PPCCS.

Because the PPCCS computer system has the phone number and/or email address of the payee, the PPCCS computer system informs the payee through email, text message and/or phone call that the check has been certified and the fund for paying the check has been secured by the PPCCS. In response to the email, message and/or phone from the PPCCS computer system, the payee deposits or cashes the check received from the payer at the payee's financial institution such as a bank, credit union, money service business, etc. The payee informs the payee's financial institution that the check has been certified by the PPCCS and the funds are available from the PPCCS. The financial institution contacts the PPCCS computer system to obtain the funds. In addition, the financial institution provides the PPCCS with account information of the payee (if it is a check deposit transaction) or the financial institution (if it is a check cashing transaction).

In one aspect of the present disclosure, after the payee financial institution provides the correct routing number, account number, check number, dollar amount, and payee name (or partial payee name) to the PPCCS computer system according to one of the check certification methods described above for either check deposit or check cashing transaction, the PPCCS transfers a fund associated with the dollar amount from the account owned by the PPCCS to an account owned by payee (if it is a check deposit transaction) or by the financial institution (if it is a check cashing transaction). Under such circumstances, the payee cannot commit fraud against the payer and no third party can commit fraud against either the payer or the payee. The present disclosure effectively protects both the payer and the payee in a check transaction.

In the above example, the payer's account, the account owned by the PPCCS and the payee's account may be with either the same financial institution or three (3) different financial institutions. The phrase "associated with" is used because the PPCCS may charge the payee a fee for providing such service. Under such circumstances, the PPCCS computer system transfers to the payee a fund that is equivalent to the dollar amount of the check minus the fee. The fund transfer can be accomplished through some real-time and/or non-real-time networks, such as ACH networks, credit card networks, debit card networks, ATM networks, broker-dealer networks, etc. This fund transfer transaction can be legitimately conducted based on a commercial arrangement between the payee and the PPCCS.

Additionally, the present disclosure also protects the privacy of the check transaction in the certification process as explained below.

As contemplated in the described aspects, one of many possible combinations is described below as an example. As shown in FIG. 1, the computer system of the Privacy Protected Check Certification System ("PPCCS") 500 certifies the legitimacy of checks through a network 600, such as the Internet, mobile network, WiFi, Bluetooth, Bluetooth Low Energy, etc., for all parties involved in the transactions. These parties include a check issuer 100 who has a checking account in Bank A 300 (a Payer Bank), a consumer 200 who cashes a check at Bank B 400 (a Payee Bank), and a remote depositor 700 who remotely deposits a check into an account of Bank B 400 (a Payee Bank).

Figure 2A:
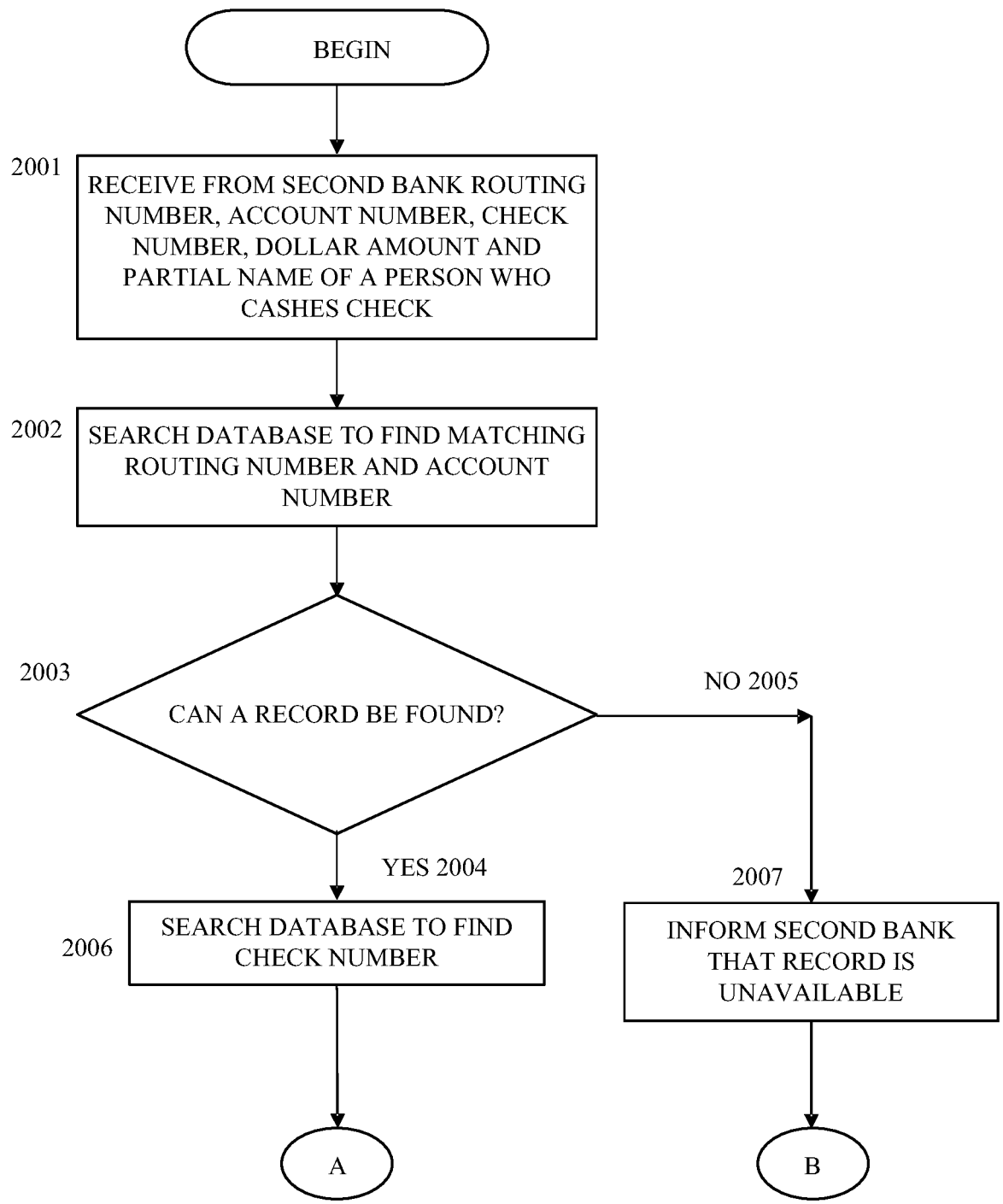
FIGS. 2A to 2B are flowcharts of an example process, indicating how the Privacy Protected Check Certification System certifies a check presented by a consumer for cashing as shown in FIG. 1, according to an aspect of the present disclosure.
Figure 2B:
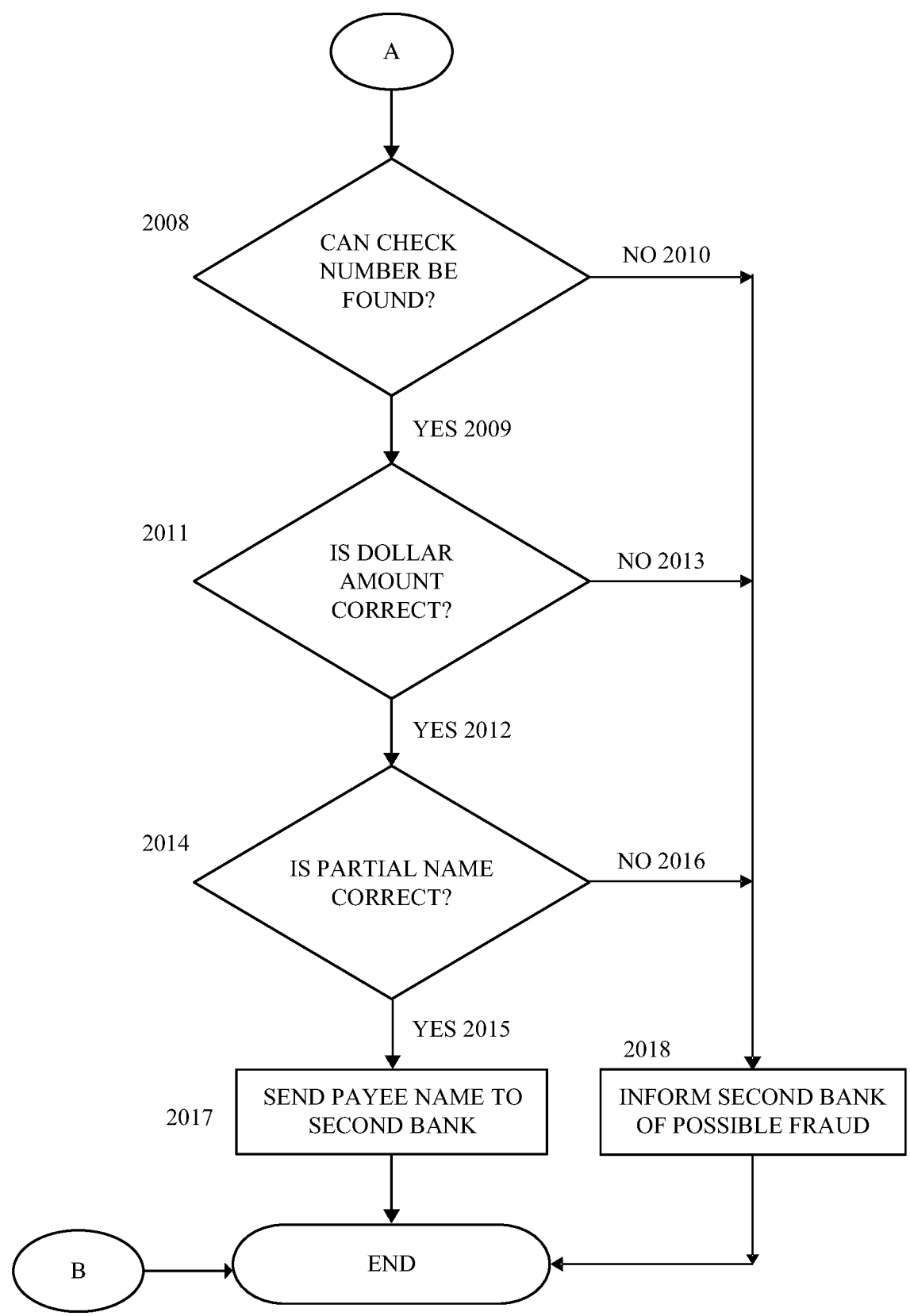

Reference should now be made to the flowchart of FIGS. 2A to 2B in combination with the system diagram of FIG. 1, which together illustrate how the computer system of the PPCCS 500 certifies the legitimacy of checks.

The check issuer 100 has a checking account with Bank A 300, which is the first bank (or Payer Bank). To use the PPCCS computer system 500, the check issuer 100 registers with the PPCCS computer system 500 as a member. In addition, the check issuer 100 provides the PPCCS computer system 500 with the routing number and account number of her checking account in Bank A 300. The routing number identifies which bank has the checking account. The account number identifies which checking account inside the identified bank belongs to the check issuer. Therefore, the combination of a routing number and an account number uniquely identifies a checking account of a check issuer. In general, a check number is a serial number that is printed on a check so that each check has a unique check number. Therefore, a set of routing number, account number and check number uniquely identifies the check, the checking account and the bank that has the checking account.

After becoming a member of the PPCCS computer system 500, the check issuer 100 uploads to the PPCCS computer system 500 check numbers, dollar amounts and payee names of all checks she has issued. The PPCCS computer system 500 stores the information into a database. There is no need to repeatedly upload the routing number and the account number because each checking account is identified by the same routing number and account number.

The check issuer 100 issues a particular check from her checking account in Bank A 300 and uploads to the PPCCS computer system 500 a check number, a dollar amount and a payee name of the check through the network 600. The check issuer 100 gives the particular check to a consumer 200. The consumer 200 cashes the particular check at a branch of Bank B 400, which is the second bank (or Payee Bank). At this time, a teller of Bank B determines whether this particular check is legitimate.

The teller of Bank B 400 sends the routing number, the account number, the check number, and the dollar amount to the PPCCS computer system 500. This information can be read by a device at the teller window and uploaded to the PPCCS computer system 500. Alternatively, the teller can manually enter the information into a device interface of the PPCCS computer system 500.

In addition, the teller of Bank B 400 manually enters some partial information of the name of the consumer 200 into a device interface of the PPCCS computer system 500. Because a teller at a bank branch is very busy, it is not practical for the teller to enter the full name of the consumer 200. Furthermore, it may create unnecessary human errors when the full name of the consumer 200 is entered. Therefore, the PPCCS computer system 500 may only prompt the teller of Bank B 400 to enter some partial name information of the consumer 200. For example, the partial name information may be an initial of the last name and an initial of the first name. As another example, the partial information may be the first three (3) letters of the last name.

Alternatively, in one aspect of the present disclosure, Bank B 400 can use a device to read the name of the consumer 200 from an official identification document of the consumer and uploads the name information to the PPCCS computer system 500.

As a result, the PPCCS computer system 500 receives from a second bank (i.e., Bank B 400) the routing number, the account number, the check number, and the dollar amount and a partial name of the consumer 200 who cashes the check at Bank B 400 (block 2001).

In general, a routing number of a bank is in the public domain and a fraudster can easily find such information. It is also not difficult for a fraudster to find an account number of the check issuer 100. Consequently, a fraudster can easily find the correct routing number and account number of check issuer 100. However, the fraudster needs to guess a check number. If the fraudster chooses a check number that has not been issued yet, the PPCCS computer system 500 will detect such check as a counterfeit check because there is no record about this check number in the database of the PPCCS system. Even if the fraudster luckily picks a check number that has already been issued, it is almost impossible to correctly guess the dollar amount and a partial name of a payee of the legitimate check. Assuming that the dollar amount is less than ten thousand dollars ($10,000) with two (2) digits in cents (e.g., $6,798.28), the probability for a fraudster to correctly guess the dollar amount is about one (1) out of one million (1,000,000). Assuming that the PPCCS system 500 requires the teller of Bank B 400 to enter the first three (3) letters of the first name, the probability for a fraudster to correctly guess these three (3) letters is about one (1) out of eighteen thousand (18,000). Therefore, the probability for the fraudster to correctly guess both the dollar amount and first three (3) letters of the first name of the payee is about one (1) out of eighteen billion (18,000,000,000).

After receiving the routing number, the account number, the check number, and the dollar amount and a partial name of the consumer 200 from the teller of Bank B 400, the PPCCS system 500 searches its database to find the matching routing number and account number (block 2002). The PPCCS computer system 500 determines whether such record exists in its database (decision block 2003). If there is no record matching the routing number and the account number (NO branch 2005), the check issuer is not a registered member of the PPCCS system 500 yet. Under such circumstances, the PPCCS computer system 500 informs the second bank (i.e., Bank B 400) that a record is unavailable (block 2007) and Bank B needs to use other methods to determine whether the check is legitimate. It is also possible that Bank B 400 will refuse to cash the check because the validity of the check cannot be verified. At this time, the teller of Bank B may encourage the consumer 200 to tell the check issuer 100 to join the PPCCS computer system 500 as a member so that consumer 200 can easily cash the check in the future.

If the PPCCS computer system 500 finds a record that matches the routing number and account number (YES branch 2004), the PPCCS computer system 500 concludes that the check issuer 100 is an existing member and the PPCCS computer system 500 should have a record of all issued checks of the check issuer 100. Therefore, the PPCCS computer system 500 proceeds to search its database for the check number provided by the teller of Bank B 400 (block 2006).

The PPCCS computer system 500 determines whether the check number is in its database (decision block 2008). If the check number is not in the database of the PPCCS computer system 500 (NO branch 2010), it is possible that a counterfeit check has been received by Bank B 400. The PPCCS computer system 500 informs the second bank (Bank B 400) of possible fraud (block 2018) because the check number has not been issued yet.

If the check number is in its database (YES branch 2009), the PPCCS computer system 500 determines whether the dollar amount matches the record in its database (decision block 2011). If the dollar amount is not correct because it does not match the record stored in the database (NO branch 2013), the PPCCS computer system 500 informs the second bank (Bank B 400) of possible fraud (block 2018) because the dollar amount is incorrect.

If the dollar amount is correct (YES branch 2012), the PPCCS computer system 500 determines whether a partial name of the person who cashes the check corresponds to the record of the payee name in its database (decision block 2014). If the partial name is incorrect because it does not match the payee name record stored in the database (NO branch 2016), the PPCCS computer system 500 informs the second bank (Bank B 400) of possible fraud (block 2018) because the partial name is incorrect.

If the partial name is correct (YES branch 2015), the PPCCS computer system 500 sends a full payee name to the teller of Bank B 400 (block 2017) because the chance of fraud is unlikely (e.g., one (1) out of eighteen billion (Ser. No. 18/000,000)). With the full name of the payee provided by the PPCCS computer system 500, the teller of Bank B 400 can easily verify whether the consumer 200 is the legitimate payee of the check.

In the above process, the private information of the check issued by check issuer 100 is fully protected. Even the teller of Bank B 400 cannot see the private information of the check unless she has seen the real check.

Alternatively, in one aspect of the present disclosure, if the full name of the consumer 200 has been uploaded to the PPCCS computer system 500, the PPCCS computer system 500 can directly compare the full name of the consumer 200 with the payee name record provided by the check issuer 100 to determine whether the consumer name corresponds to the payee name record. Under such circumstances, no information about the check record will be disclosed in the certification process.

Furthermore, three (3) variables are used in this privacy protected certification process. These three (3) variables include: check number, dollar amount and payee name. The above certification process keeps the payee name as the last information to be confirmed in the process. In practice, the sequence of the confirming process can be changed. For example, in one aspect of the present disclosure, the PPCCS computer 500 asks the Payee Bank 400 to provide correct check number and payee name before providing the Payee Bank 400 with the dollar amount. In another aspect of the present disclosure, the PPCCS computer 500 asks the Payee Bank 400 to provide correct dollar amount and payee name before providing the Payee Bank 400 with the check number. All of the above certification processes can work effectively to certify a check transaction.

Figure 3A:
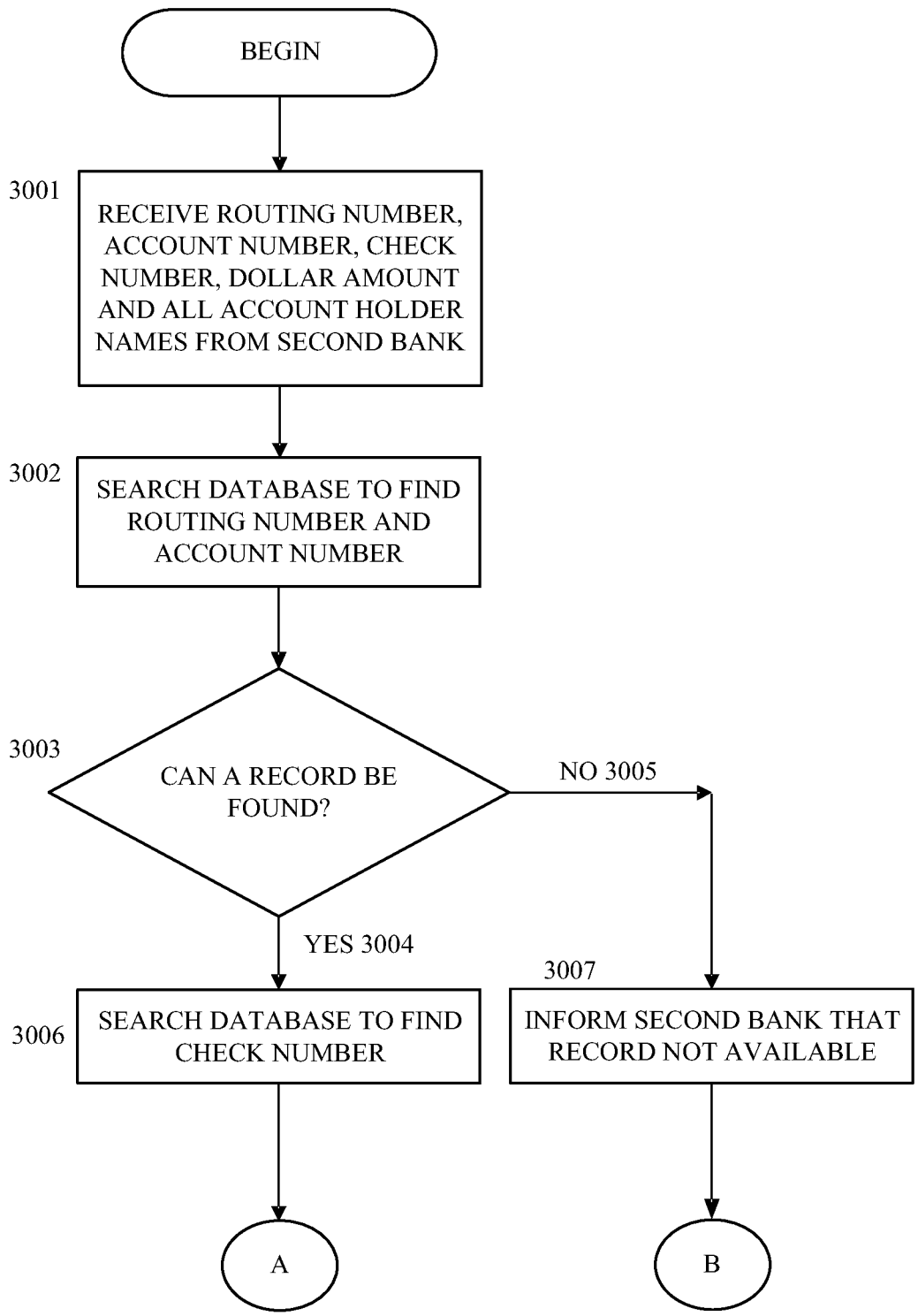
FIGS. 3A to 3B are flowcharts of an example process, indicating how the Privacy Protected Check Certification System certifies a check deposited by a remote depositor as shown in FIG. 1, according to an aspect of the present disclosure.
Figure 3B:
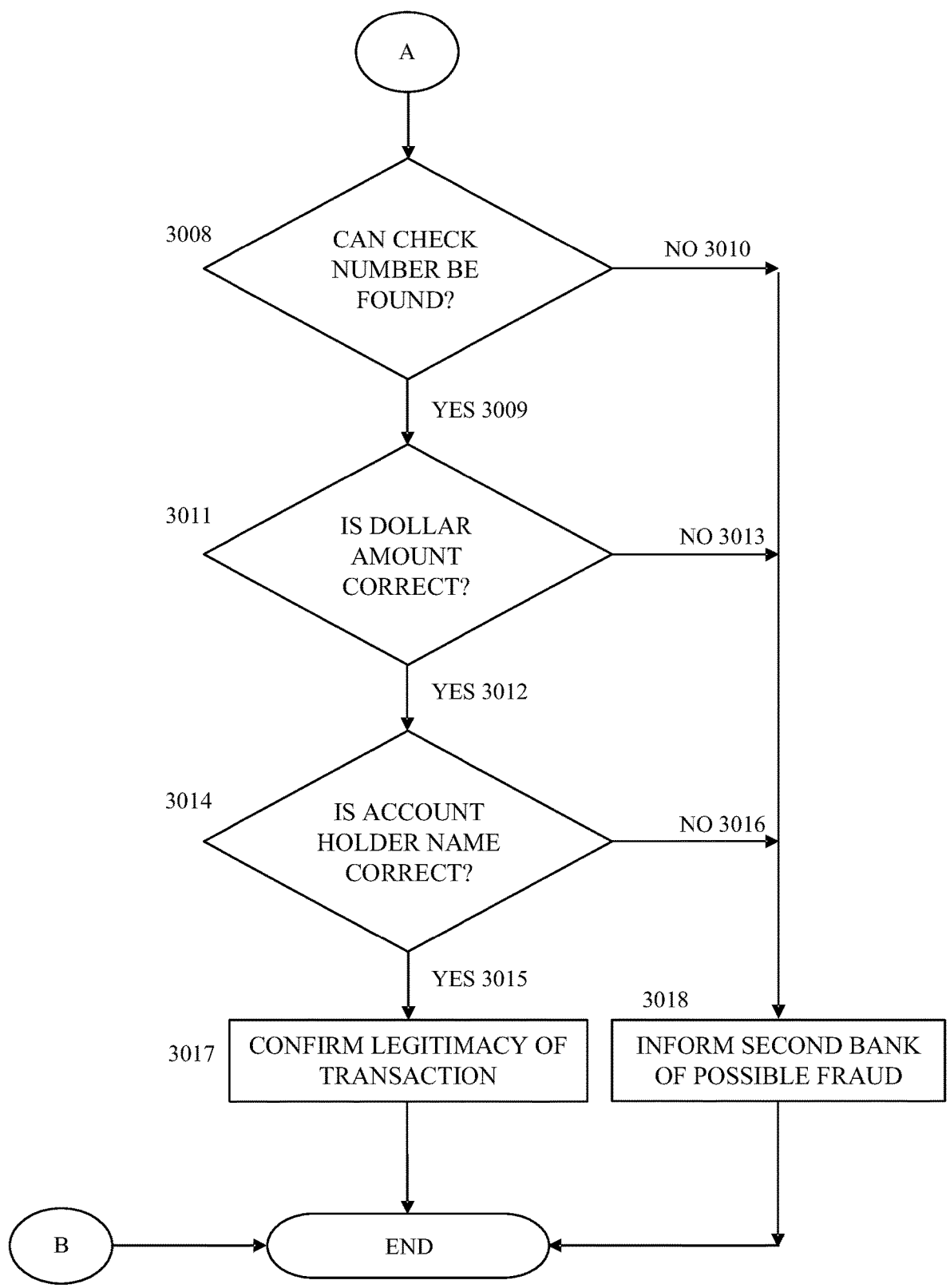

When a bank verifies whether a deposited check is legitimate, reference should be made to the flowchart of FIGS. 3A to 3B in combination with the system diagram of FIG. 1, which together illustrate how the computer system of the PPCCS 500 certifies the legitimacy of the deposited check.

Similar to the example for cashing a check as described above, the check issuer 100 issues a particular check from her checking account in Bank A 300 and uploads to the PPCCS computer system 500 a check number, a dollar amount and a payee name of the particular check through the network 600. The check issuer 100 gives the particular check to a consumer 700. The consumer 700 remotely deposits the particular check into Bank B 400, which is the second bank (or Payee Bank). At this time, a person working in the back office of Bank B 400 determines whether this particular check is legitimate.

When the consumer 700 remotely deposits a check into an account of Bank B 400, the consumer 700 should be one of the account holders of the account. A person of Bank B 400 sends the routing number, account number, check number, and dollar amount of the deposited check to the PPCCS computer system 500. Additionally, the person of Bank B 400 sends to the PPCCS computer system 500 all names of holders of the account, which receives the deposited check.

Alternatively, a system in Bank B 400 automatically sends to the PPCCS computer system 500 the routing number, account number, check number, and dollar amount of the deposited check as well as all names of holders of the account, which receives the deposited check. As a result, the PPCCS computer system 500 receives the routing number, account number, check number, and dollar amount of the deposited check as well as all names of account holders of the account that receives the deposited check (block 3001).

Then, the PPCCS system 500 searches its database to find the matching routing number and account number from its database (block 3002). The PPCCS computer system 500 determines whether such record exists in its database (decision block 3003). If there is no record matching the routing number and the account number (NO branch 3005), the check issuer is not a registered member of the PPCCS system 500 yet. Under such circumstances, the PPCCS computer system 500 informs the second bank (i.e., Bank B 400) that a record is unavailable (block 3007) and Bank B 400 may need to use other methods to determine whether the check is legitimate.

If the PPCCS computer system 500 finds a record that matches the routing number and account number (YES branch 3004), the PPCCS computer system 500 concludes that the check issuer 100 is an existing member and the PPCCS computer system 500 should have a record of all issued checks of the check issuer 100. Therefore, the PPCCS computer system 500 proceeds to search its record to find the check number provided by Bank B 400 (block 3006).

The PPCCS computer system 500 determines whether the check number is in its database (decision block 3008). If the check number is not in the database of the PPCCS computer system 500 (NO branch 3010), it is possible that a counterfeit check has been received by Bank B 400. The PPCCS computer system 500 informs the second bank (Bank B 400) of possible fraud (block 3018) because the check number has not been issued yet.

If the check number is in its database (YES branch 3009), the PPCCS computer system 500 determines whether the dollar amount matches the record in its database (decision block 3011). If the dollar amount is not correct because it does not match the record stored in the database (NO branch 3013), the PPCCS computer system 500 informs the second bank (Bank B 400) of possible fraud (block 3018) because the dollar amount is incorrect.

If the dollar amount is correct (YES branch 3012), the PPCCS computer system 500 determines whether any name of the holders of account, which receives the deposited check, corresponds to the payee name record in its database (decision block 3014), because one of the account holders should be the payee of the check.

If none of the names of the account holders is correct because none of the names corresponds to the payee name in the check record stored in the database (NO branch 3016), the PPCCS computer system 500 informs the second bank (Bank B 400) of possible fraud (block 3018) because the check is not deposited by the payee.

In addition, the PPCCS computer system 500 also informs the Payer Bank 300 because this possible fraudulent check may have already been sent back to the Payer Bank 300 as an inclearing check by Federal Reserve. As explained earlier, because the electronic file, which contains the list of inclearing checks, provided by Federal Reserve does not include payee names, an inclearing check with an altered payee name cannot be easily detected by the Payer Bank 300.

Therefore, when the Payee Bank 400 protects itself against deposit fraud, the present disclosure enables the Payer Bank 300 to detect fraud associated with altered check and forged check. As a result, the Payer Bank 300 and the Payee Bank 400 jointly benefit from the check certification process provided by the PPCCS computer system 500.

If one of the names of the account holders corresponds to the payee name in the check record stored in the database (YES branch 3015), the PPCCS computer system 500 confirms the legitimacy of the check transaction (block 3017). As a result, the Payee Bank 400 is fully protected by the PPCCS computer system 500 against deposit fraud.

In one aspect of the present disclosure, the PPCCS computer system 500 informs the Payer Bank 300 of the legitimacy of the check deposit transaction. In another aspect of the present disclosure, the PPCCS computer system 500 informs the Payee Bank 400 of the legitimacy of the check deposit transaction.

In practice, it may not be necessary to certify all deposited checks in Bank B 400 because of the overhead involved. In one aspect of the present disclosure, Bank B 400 only identifies risky deposited checks and sends those checks to the PPCCS computer system 500 for certification. A risky deposited check can be identified by comparing the current check deposited into an account with the historical checks deposited into the same account. For example, if the dollar amount of the current deposited check is much larger than the dollar amounts of the historical deposited checks, the current deposited check may be risky because it is unusual for the account to receive such a large deposit. A risky deposited check can also be identified by analyzing the risk exposure of an account if the deposited check is a counterfeit check. For example, if the dollar amount of the current deposited check is substantially larger than the balance of the account that receives the deposited check, the current deposited check may be risky because if the deposited check is identified as counterfeit later and the account holder has already withdrawn the money from the deposited check, Bank B 400 may not be able to recover its loss from the account holder.

In order to protect the Payer Bank 300, a fraud prevention system of the Payer Bank 300 can be connected to the PPCCS computer system 500. In one aspect of the present disclosure, the PPCCS computer system 500 sends all records of all check issuers, whose checking accounts are with the Payer Bank 300, to the fraud prevention system of the Payer Bank 300. If any on-us check or inclearing check of the Payer Bank 300 does not match the records received from the PPCCS computer system 500, the fraud prevention system alerts the Payer Bank 300 because something is wrong. Therefore, the Payer Bank 300 is also fully protected by the PPCCS computer system 500.

In one aspect of the present disclosure, if a particular check of Payer Bank 300 has already been cleared by the Payer Bank 300, the Payer Bank 300 informs the PPCCS computer system 500 of the routing number, account number and check number of the cleared check. As a result, the PPCCS computer 500 can detect a potential fraud when a check with the same routing number, account number and check number is presented for certification again.

In summary, many aspects of the present disclosure effectively certify the legitimacy of check transactions and prevent all types of fraud associated with checks.

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired non-transitory program code in the form of instructions or data structures and that can be accessed by a computer; disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The aspects described in this disclosure can be assembled to form a variety of applications based on the need. Those skilled in the art and technology to which this disclosure pertains can appreciate that alterations and changes in the described structure may be practiced without meaningfully departing from the principal, spirit and scope of this disclosure. Such alterations and changes should not be construed as deviations from the present disclosure.

What is claimed is:

1. A check certification computer system, comprising:
a memory device; and
at least one processor coupled to the memory device, the at least one processor configured:
to receive, from a check issuer computer system, a first payee name and first check of a first check, the first check information comprising at least one of a first routing number, a first account number, a first check number, a first dollar amount associated with an issued check, or a combination thereof;
to associate the first payee name with the first check information;
to receive, from a payee financial institution (PFI) computer system of a PFI, second check information electronically obtained from a second check by a check information capturing device, the check certification computer system, the check issuer computer system and the PFI computer system each being independent from one another, the second check information comprising at least one of a second routing number, a second account number, a second check number, a second dollar amount from a received paper check, or a combination thereof;
to receive, from the PFI computer system, a second payee name electronically read from a government issued identification document of a second payee obtained by an identification information capturing device, the second payee name printed on the government issued identification document, written on a magnetic medium of the government issued identification document, or stored in a memory of the government issued identification document, and the government issued identification document being different from the first check and the second check;
to compare the first check information with the second check information;
to verify the second payee name by comparing the first payee name received from the check issuer computer system to the second payee name electronically read from the government issued identification document of the second payee, the second payee name verified when the first check information matches the second check information;
to record a result of the verifying; and
to send, to the PFI computer system in response to verifying the second payee name, a name verification message indicating the first payee name corresponds to the second payee name.

2. The check certification computer system of claim 1, in which the at least one processor is further configured to receive a name of an account holder of a deposit account.

3. The check certification computer system of claim 1, in which the at least one processor is further configured to record a time stamp corresponding to the verification, the result and time stamp used to identify fraud when the second check information is received, at a time after the time stamp, from a financial institution that is different from the PFI.

4. The check certification computer system of claim 1, in which the check issuer computer system is associated with a checking account holder, the checking account holder having an account at a payer financial institution comprising a bank, credit union, trust company, insurance company, stockbroker, stock dealer, investment company or any organization that offers a checking account to a customer.

5. The check certification computer system of claim 1, in which the PFI comprises a bank, credit union, trust company, insurance company, stockbroker, stock dealer, investment company, money services business, casino, or any organization that pays money to a person in response to receiving a paper check from the person.

6. A non-transitory computer readable medium tangibly storing program code on a check certification computer system, the program code comprising:
program code to receive, from a check issuer computer system, a first payee name and first check information of a first check, the first check information comprising at least one of a first routing number, a first account number, a first check number, a first dollar amount associated with an issued check, or a combination thereof;
program code to associate the first payee name with the first check information;
program code to receive, from a payee financial institution (PFI) computer system of a PFI, second check information electronically obtained from a second check by a check information capturing device, the check certification computer system, the check issuer computer system and the PFI computer system each being independent from one another, the second check information comprising at least one of a second routing number, a second account number, a second check number, a second dollar amount from a received paper check, or a combination thereof;

program code to receive, from the PFI computer system, a second payee name electronically read from a government issued identification document of a second payee obtained by an identification information capturing device, the second payee name printed on the government issued identification document, written on a magnetic medium of the government issued identification document, or stored in a memory of the government issued identification document, and the government issued identification document being different from the first check and the second check;

program code to compare the first check information with the second check information;

program code to verify the second payee name by comparing the first payee name received from the check issuer computer system to the second payee name electronically read from the government issued identification document of the second payee, the second payee name verified when the first check information matches the second check information;

program code to record a result of the verifying; and program code to send, to the PFI computer system in response to verifying the second payee name, a name verification message indicating the first payee name corresponds to the second payee name.

7. The non-transitory computer readable medium of claim 6, in which the program code further comprises program code to receive a name of an account holder of a deposit account.

8. The non-transitory computer readable medium of claim 6, in which the program code further comprises program code to record a time stamp corresponding to the verification, the result and time stamp used to identify fraud when the second check information is received, at a time after the time stamp, from a financial institution that is different from the PFI.

9. The non-transitory computer readable medium of claim 6, in which the check issuer computer system is associated with a checking account holder, the checking account holder having an account at a payer financial institution comprising a bank, credit union, trust company, insurance company, stockbroker, stock dealer, investment company or any organization that offers a checking account to a customer.

10. The non-transitory computer readable medium of claim 6, in which the PFI comprises a bank, credit union, trust company, insurance company, stockbroker, stock dealer, investment company, money services business, casino, or any organization that pays money to a person in response to receiving a paper check from the person.

11. A method for check verification, comprising:

receiving, at a check certification computer system from a check issuer computer system, a first payee name and first check information of a first check, the first check information comprising at least one of a first routing number, a first account number, a first check number, a first dollar amount associated with an issued check, or a combination thereof;

associating the first payee name with the first check information;

receiving, at the check certification computer system from a payee financial institution (PFI) computer system of a PFI, second check information electronically obtained from a second check by a check information capturing device, the check certification computer system, the check issuer computer system and the PFI computer system each being independent from one another, the second check information comprising at least one of a second routing number, a second account number, a second check number, a second dollar amount from a received paper check, or a combination thereof;

receiving, from the PFI computer system, a second payee name electronically read from a government issued identification document of a second payee obtained by an identification information capturing device, the second payee name printed on the government issued identification document, written on a magnetic medium of the government issued identification document, or stored in a memory of the government issued identification document, and the government issued identification document being different from the first check and the second check;

comparing the first check information with the second check information;

verifying the second payee name by comparing the first payee name received from the check issuer computer system to the second payee name electronically read from the government issued identification document of the second payee, the second payee name verified when the first check information matches the second check information;

recording a result of the verifying; and sending, to the PFI computer system in response to verifying the second payee name, a name verification message indicating the first payee name corresponds to the second payee name.

12. The method of claim 11, further comprising receiving a name of an account holder of a deposit account.

13. The method of claim 11, further comprising recording a time stamp corresponding to the verification, the result and time stamp used to identify fraud when the second check information is received, at a time after the time stamp, from a financial institution that is different from the PFI.

14. The method of claim 11, in which the check issuer computer system is associated with a checking account holder, the checking account holder having an account at a payer financial institution comprising a bank, credit union, trust company, insurance company, stockbroker, stock dealer, investment company or any organization that offers a checking account to a customer.

15. The method of claim 11, in which the PFI comprises a bank, credit union, trust company, insurance company, stockbroker, stock dealer, investment company, money services business, casino, or any organization that pays money to a person in response to receiving a paper check from the person.

* * * * *